United States Patent
Martinez et al.

(10) Patent No.: US 12,548,083 B1
(45) Date of Patent: *Feb. 10, 2026

(54) SYSTEM AND METHOD FOR INTERPRETING PREDICTIONS FROM MACHINE LEARNING MODELS USING NATURAL LANGUAGE

(71) Applicant: UIPCO, LLC, San Antonio, TX (US)

(72) Inventors: Lauren Martinez, Boerne, TX (US); Sarah J. Boukhris-Escandon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/501,241

(22) Filed: Nov. 3, 2023

Related U.S. Application Data

(63) Continuation of application No. 17/691,372, filed on Mar. 10, 2022, now Pat. No. 11,842,408.

(Continued)

(51) Int. Cl.
*G06Q 40/08* (2012.01)
*G06N 5/01* (2023.01)
(Continued)

(52) U.S. Cl.
CPC .............. *G06Q 40/08* (2013.01); *G06N 5/01* (2023.01); *G06Q 30/0631* (2013.01); *G06N 20/00* (2019.01)

(58) Field of Classification Search
CPC ...... G06Q 40/08; G06Q 30/0631; G06N 5/01; G06N 20/00
(Continued)

(56) References Cited

U.S. PATENT DOCUMENTS 7,970,661 B1 6/2011 Abraham
8,843,432 B2 * 9/2014 Matsumoto ............ G06N 20/00
706/52

(Continued)

FOREIGN PATENT DOCUMENTS

WO WO-2020065611 A1 4/2020

OTHER PUBLICATIONS

Singh et al., "Ensuring Transparency and Fairness in AI Decision-Making Processes Influenced Processes Influenced by Large Language Models", 13th IEEE International Conference on Communication Systems and Network Technologies. (Year: 2024).*

(Continued)

*Primary Examiner* — Frantzy Poinvil
(74) *Attorney, Agent, or Firm* — Plumsea Law Group, LLC

(57) ABSTRACT

The embodiments provide a system and method for interpreting predictions from machine learning systems using natural language. The system includes a prediction module and an explanation module. The prediction module includes a machine learning model to make predictions for quantities such as recommended coverage amounts for insurance policies. The explanation module includes an impact analyzer that calculates impact values, which represent the degree of influence that each attribute has on predicted values. The explanation module also includes a natural language processing system for transforming generating natural language explanations indicating how the user attributes have influenced the predicted value.

20 Claims, 8 Drawing Sheets

Related U.S. Application Data

(60) Provisional application No. 63/159,506, filed on Mar. 11, 2021.

(51) Int. Cl.
  *G06Q 30/0601* (2023.01)
  *G06N 20/00* (2019.01)
(58) Field of Classification Search
  USPC .................................................. 705/3–44
  See application file for complete search history.

(56) References Cited

U.S. PATENT DOCUMENTS

| | | |
|---|---|---|
| 9,542,400 B2 | 1/2017 | Doering |
| 10,740,847 B1 | 8/2020 | Devereaux |
| 11,315,196 B1 | 4/2022 | Narayan |
| 11,568,148 B1 * | 1/2023 | Nichols ................. G06F 40/237 |
| 11,575,968 B1 * | 2/2023 | Barlik .................. H04N 21/278 |
| 11,580,455 B2 | 2/2023 | Sarferaz |
| 11,593,773 B1 * | 2/2023 | Yip .................... G06Q 20/4015 |
| 11,669,753 B1 * | 6/2023 | Gupta ...................... G06N 5/04 706/12 |
| 2016/0163186 A1 | 6/2016 | Davidson |
| 2018/0232676 A1 | 8/2018 | Hlasyszyn |
| 2018/0241881 A1 * | 8/2018 | Li ........................ G06N 3/0464 |
| 2019/0340518 A1 | 11/2019 | Merrill |
| 2019/0378210 A1 | 12/2019 | Merrill |
| 2022/0327625 A1 | 10/2022 | Leung |
| 2022/0343238 A1 * | 10/2022 | Matsuoka ........ G06Q 10/06311 |
| 2022/0351107 A1 * | 11/2022 | Sinonis ................ G06Q 10/087 |
| 2023/0206096 A1 * | 6/2023 | Paiement ................. G06N 3/08 706/52 |
| 2024/0177068 A1 * | 5/2024 | Fusting ................. G06N 20/00 |
| 2025/0077946 A1 * | 3/2025 | Sharpe ................... G06N 20/20 |

OTHER PUBLICATIONS

Sahu et al., "Blockchain and MAchine Learning Integrated Secure Driver Behavior Centric Electric Vehicle Insurance Model", IEEE Transactions on Intelligent Transportation Systems, vol. 25, No. 11, Nov. 2024.*

Non-Final Office Action mailed Apr. 18, 2023 for U.S. Appl. No. 17/691,372.

Migliore et al., "Contemporary Marketing Evolves", Journal of Marketing Development and Competitiveness vol. 12(2). Year: 2018.

Notice of Allowance mailed Aug. 2, 2023 for U.S. Appl. No. 17/691,372.

* cited by examiner

SYSTEM AND METHOD FOR INTERPRETING PREDICTIONS FROM MACHINE LEARNING MODELS USING NATURAL LANGUAGE

CROSS-REFERENCE TO RELATED APPLICATIONS

This application is continuation of co-pending U.S. patent application Ser. No. 17/691,372, filed Mar. 10, 2022, and titled "System and Method for Interpreting Predictions from Machine Learning Models Using Natural Language", which claimed the benefit of Provisional Patent Application No. 63/159,506, filed Mar. 11, 2021, and titled "System and Method for Interpreting Predictions from Machine Learning Models Using Natural Language". The entire disclosures of both applications are incorporated herein by reference.

TECHNICAL FIELD

The present disclosure generally relates to computing systems, and in particular to computing systems and methods for interpreting predictions from machine learning models using natural language.

BACKGROUND

More and more, companies and organizations rely on the use of computing algorithms to make predictions about consumers or users of their products and services. Often, however, the processes used to arrive at these predictions are opaque to the consumers. In some cases, consumers may not be at all aware of the information that has been used by the company in arriving at a particular prediction. Moreover, if complex algorithms are used as part of the prediction process, neither the company nor the customer may have much insight into what factors most influenced the predicted value.

There is a need in the art for a system and method that addresses the shortcomings discussed above.

SUMMARY

In one aspect, a computer-implemented method of assisting a user in understanding the impact of one or more user attributes on a value predicted by a machine learning system includes receiving from the user, at one or more computing systems, a request for a financial product or service. The method also includes steps of retrieving, by the one or more computing systems, a set of user attributes associated with the user and predicting, using a machine learning system implemented by the one or more computing systems, a predicted value for the user, where the machine learning system uses information from the set of user attributes as input. The machine learning system comprises a set of model parameters. The method also includes calculating, using an attribute impact analyzer implemented by the one or more computing systems, an impact value for each user attribute in the set of user attributes, where the attribute impact analyzer uses information from the set of model parameters and the set of user attributes as input. The method also includes generating, by the one or more computing systems, a natural language explanation of the impact of at least one of the user attributes on the predicted value, and communicating, by the one or more computing systems, the predicted value and the natural language explanation of the impact of at least one of the user attributes on the predicted value to the user.

In another aspect, a computer-implemented method of assisting a user in understanding the impact of one or more user attributes on a recommended coverage amount for an insurance policy includes receiving from the user, at one or more computing systems, a request for a recommended coverage amount for an insurance policy. The method also includes retrieving, at the one or more computing systems, a set of user attributes associated with the user. The method also includes predicting, using a machine learning system implemented by the one or more computing systems, a recommended coverage amount for the user, where the machine learning system uses information from the set of user attributes as input. The machine learning system comprises a set of model parameters. The method also includes communicating, by the one or more computing systems, the recommended coverage amount to the user. The method also includes receiving, at the one or more computing systems, a question from the user about the impact of at least one user attribute on the recommended coverage amount. The method also includes calculating, using an attribute impact analyzer implemented by the one or more computing systems, an impact value for the at least one each user attribute, where the attribute impact analyzer uses information from the set of model parameters and the set of user attributes as input. The method also includes generating, using a natural language processing system implemented by the one or more computing systems, a natural language answer to the question from the user, where the natural language answer includes information about the impact of the at least one user attribute on the recommended coverage amount. The method also includes communicating, by the one or more computing systems, the natural language answer to the user.

In another aspect, a computing system includes a device processor and a non-transitory computer readable medium storing instructions that are executable by the device processor. The computing system also includes a communication interface for transferring information between the computing system and a user, and a machine learning system for predicting a recommended coverage value based on a set of user attributes, the machine learning system comprising a set of model parameters. The computing system also includes an attribute impact analyzer for calculating impact values for each user attribute, where the attribute impact analyzer uses at least information about the set of model parameters and the set of user attributes as input. The computing system also includes a natural language processing system for generating a natural language summary of the impact of one or more user attributes on the recommended coverage value.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the inven

DETAILED DESCRIPTION

The embodiments provide a system and method for helping users understand the impact of various features on a predicted value generated by a machine learning model. In one embodiment, a method may include predicting a value for a user based on various user attributes. The method may further include analyzing the impact of the user attributes on the predicted value. This can include determining which user attribute(s) most influence the predicted value in either a positive or negative direction. The method also includes generating a natural language explanation that conveys to the user how one or more of the user attributes impact the predicted value.

As described in further detail below, such models may be used, for example, in situations where a company predicts a recommended quantity for a financial product, instrument, or service. For example, when a person applies for rental insurance, the insurance company could use machine learning algorithms to predict a recommended coverage amount for the renter's policy. The machine learning algorithm could make predictions based on various user attributes. Moreover, using the exemplary system and method, the company could also provide insight into which user attributes had the greatest impact on the recommended coverage amount predicted by the machine learning algorithm. To accomplish this, the method includes a step of predicting a recommended coverage amount based on at least a set of user attributes, as well as a step of analyzing how the user attributes impact the predicted recommended coverage amount. Specifically, the method includes a step of analyzing the model used to predict the recommended coverage amount in order to understand how sensitive the final output is to the values of the user attributes for a given user. Based on this analysis, the method further includes steps of generating a natural language explanation that conveys to the user how one or more user attributes impacted the recommended coverage amount.

Using the exemplary systems and methods, users may be better able to understand how various attributes impact rental coverage recommendations, suggested borrowing amounts for loans, as well as other predicted quantities. This can reduce user frustration and increase overall satisfaction. Moreover, these systems and methods may help companies maintain compliance with various regulations by ensuring that certain user attributes are not overweighted and/or underweighted.

Figure 1:
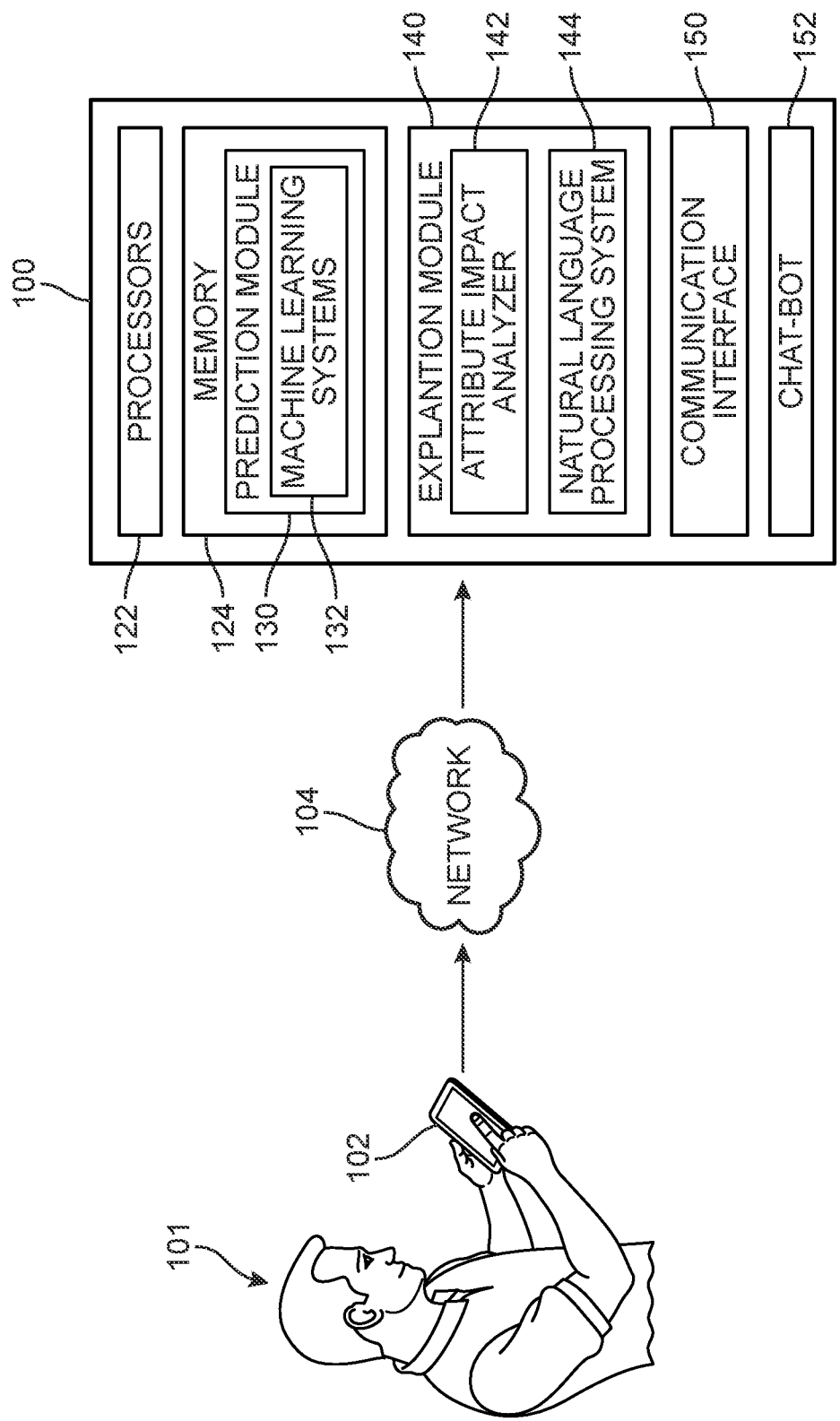
- FIG. 1 is a schematic view of a computing system in communication with a customer, according to an embodiment.

FIG. 1 is a schematic view of a computing system 100, which may be in communication with a user device 102 by way of a network 104. As used herein, a "user" may be any user of computing system 100, including users of any software implemented by computing system 100. In some cases, a user may be referred to as a "customer," as the user may be engaging in the purchase of a financial product, instrument, or other service. In one embodiment, user 101 uses device 102 to communicate with computing system 100 in order to inquire about and/or purchase a product, instrument, or other service.

Computing system 100 may comprise one or more computers, including one or more servers. In the exemplary embodiment, computing system 100 is shown as a single server. However, it may be appreciated that in some other embodiments the exemplary systems and components shown in FIG. 1 could be distributed over two or more computing systems via any kind of networks.

Computing system 100 may comprise processors 122 and memory 124. Memory 124 may comprise a non-transitory computer readable medium. Instructions stored within memory 124 may be executed by the one or more processors 122.

Computing system 100 may further comprise a prediction module 130. Prediction module 130 may be configured to provide predictions for one or more quantitative values in response to one or more inputs. For example, in one embodiment, prediction module 130 may be configured to provide predictions for a recommended coverage amount (or "amount of insurance") for a rental insurance policy.

Prediction module 130 may further comprise one or more machine learning systems 132. As used herein, a machine learning system is any system that can learn from data. Machine learning systems may make use of one or more machine learning models, or algorithms. Exemplary machine learning models include, but are not limited to, regression models, neural networks, decision trees, support vector machines, Bayesian networks, as well as other suitable models.

Computing system 100 may also comprise an explanation module 140. Explanation module 140 may include components that facilitate understanding the predictions generated by prediction module 130. Explanation module 140 may further include an attribute impact analyzer 142 for analyzing the effects of various user attributes on predicted values. In some embodiments, attribute impact analyzer 142 may comprise algorithms that calculate the Shapely values for one or more user attributes. The user attributes may be inputs to a particular machine learning model (such as a model used within machine learning systems 132). Here, the "Shapely value" for a feature or input to a machine learning model is defined as the average marginal contribution of a feature value over all possible iterations of the model. The Shapely value can be used to infer how much the current predicted value differs from a baseline/reference value as a result of the user attributes having particular values. Given a list of Shapely values for a set of user attributes for a given model, the larger the value the more the user attribute influenced the final prediction, relative to a baseline.

Shapely values can be calculated, for example, using open source software packages such as Shapley Additive Explanations (SHAP). In other embodiments, attribute impact analyzer 142 may comprise algorithms that use local linear methods to interpret the impact of features on the predicted value within a particular subset of the model domain. For example, embodiments could use the Local Interpretable Model-agnostic Explanations (LIME) open source software.

Additionally, explanation module 140 may include natural language processing system 144 for translating the outputs of attribute impact analyzer 142 into natural language explanations that can be understood by an end user (such as a consumer). In some embodiments, natural language processing system 144 may comprise pre-existing templates that can be dynamically updated with values computed by attribute impact analyzer 142. This gap-filling approach could be used in situations where only a brief natural language summary of the impact of certain user attributes are required. For more dynamic configurations, including situations where a system is expected to respond to real-time questions from a user, natural language processing system 144 may also comprise natural language generation (NLG) systems that can be used to transform structured data, such as attribute impact values, into natural language that can be communicated to an end user. Examples of NLG systems that could be used include, but are not limited to: Markov chain models, recurrent neural networks (RNNs), long short-term memory (LTSM) networks, and transformer models.

Computing system 100 can also include a communication interface 150. Communication interface 150 may comprise a combination of hardware components and/or software modules for communicating information with device 102 over network 104. For instance, communication interface 150 may include any necessary application programming interfaces (APIs) for communicating with a client running on user device 102. Communication interface 150 may also comprise any hardware and/or software necessary to communicate over local and/or wide area networks, including but not limited to: WiFi components, ethernet components, cellular communication components as well as other components.

In embodiments where computing system 100 may engage in a question and response dynamic with a user, computing system 100 could also include components like chat-bot software, which could be associated with communication interface 150, or which could be provided as a separate module (chat bot 152). For example, a chat-bot could be used to guide a user through the process of requesting insurance coverage. The chat-bot could then retrieve a predicted coverage amount from prediction module 130, along with any explanations from explanation module 140, and communicate that information to user 101. In situations where the user asks questions about the impact of user attributes on the predicted coverage amount, the chat-bot could pass the questions to explanation module 140, which may in turn pass a natural language answer or response back to the chat-bot, to be relayed to the user.

Figure 2:
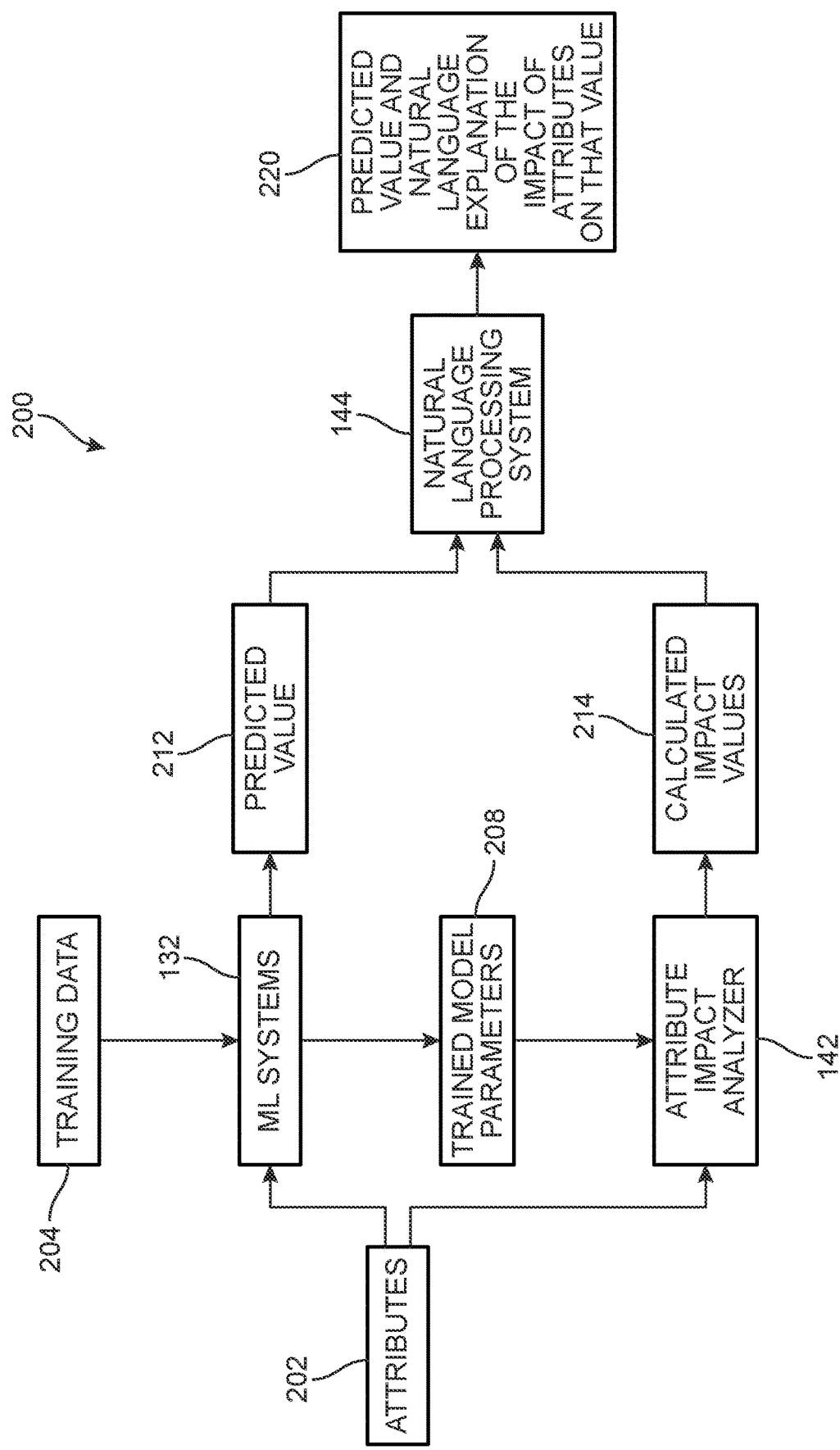
FIG. 2 is a schematic view of an architecture for providing a predicted value and for generating a natural language explanation of the impact of one or more attributes on the predicted value, according to an embodiment.

FIG. 2 is a schematic view of one embodiment of an architecture 200 for generating a natural language explanation of a predicted value and the impact of various attributes on that value. The architecture 200 includes machine learning systems 132. In this context, machine learning systems 132 include at least one machine learning model configured to determine a predicted value 212 based on input that includes attributes 202. Moreover, it is to be understood that machine learning systems 132 have been previously trained with training data 204. Training data 204 may comprise historic and/or synthetic data with attributes and target predicted values.

Architecture 200 further includes attribute impact analyzer 142. Attribute impact analyzer 142 takes as inputs both attributes 202 and the trained model parameters 208, which are associated with machine learning systems 132. For example, if machine learning systems 132 comprises a decision tree model, the trained model parameters 208 comprise various parameters that represent that particularly trained instance of the decision tree model. More generally, the input to attribute impact analyzer 142 could be any information that can be used by attribute impact analyzer 142 to generate various predictions from the machine learning model over a range of inputs (e.g., a range of different values for each attribute).

The output of attribute impact analyzer 142 may be a set of calculated impact values 214. In some embodiments, these calculated impact values may be the corresponding Shapely values for the attributes.

Simply calculating the impact values, however, is not sufficient to provide an explanation of the impact of various attributes to a user. Therefore, the present architecture 200 further includes natural language processing system 144 to generate a natural explanation of the meaning of the impact values. Specifically, system 144 outputs the predicted value as well as a natural language explanation of the impact of the attributes on that predicted value (output 220). This natural language explanation can then be communicated to the user, as described in further detail below.

Figure 3:
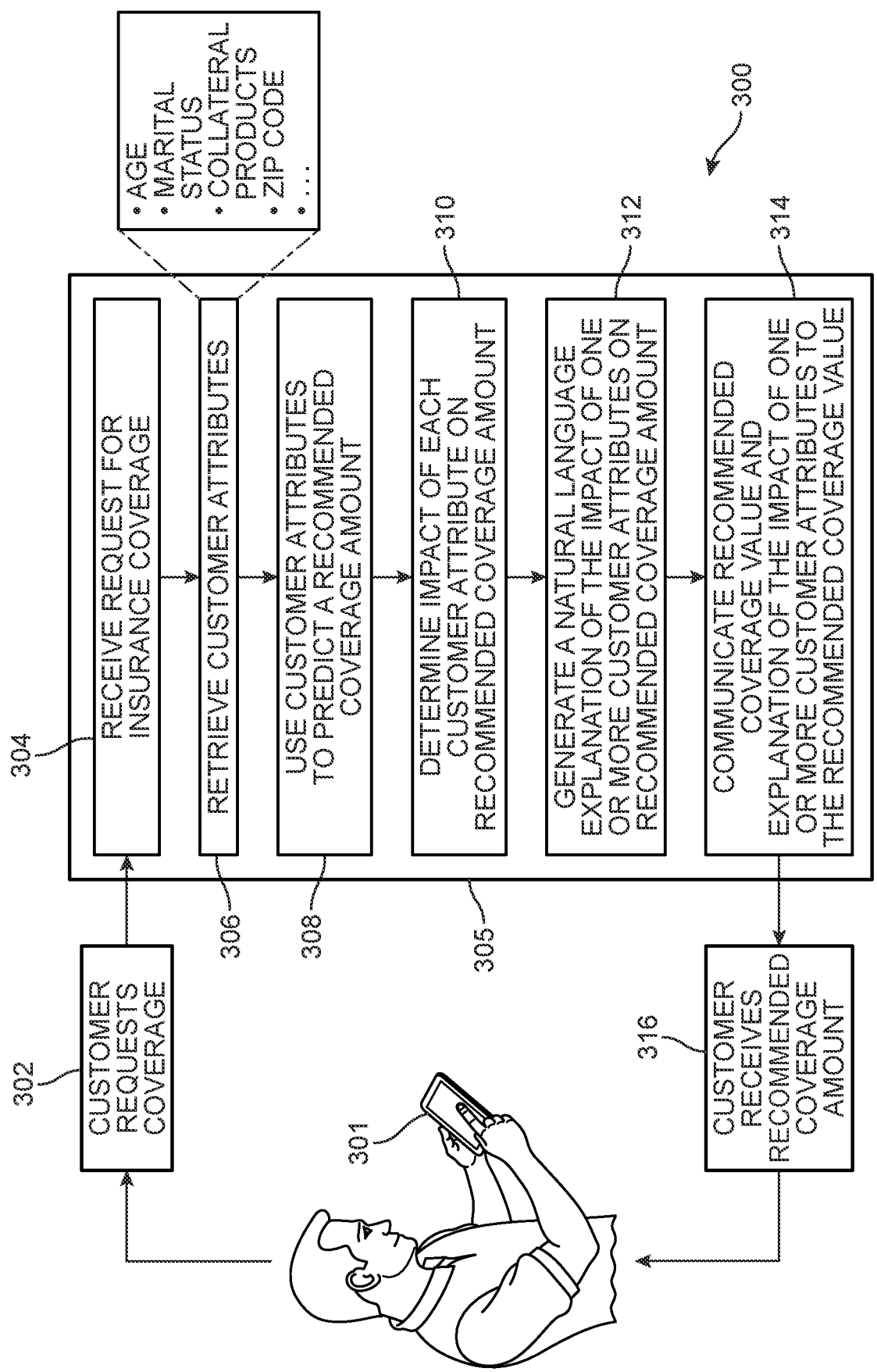
FIG. 3 is a schematic view of a process for predicting a recommended coverage amount and generating a natural language explanation of the impact of one or more attributes on the recommended coverage amount, according to an embodiment.

FIG. 3 is a schematic view of how the exemplary system may be used in a particular context to assist a user. Specifically, FIG. 3 shows a process for generating predicted values and for assisting users in understanding the impact of various user attributes on a those predicted values. In this example, the user is a customer of a financial services institution, and the user wants to obtain renter's insurance. As part of the process of obtaining insurance, the institution may provide a recommended coverage amount for the customer, indicating an appropriate amount of insurance for the customer. In the exemplary embodiment, the institution uses attributes of the customer to predict a recommended coverage amount using a machine learning model. Then, the institution analyzes the impact of the customer attributes on the predicted recommended coverage amount. The output of this analysis is then transformed into a natural language explanation that can be communicated to the customer.

The exemplary process 300 begins at step 302, where a customer may submit a request for renter's insurance. In some cases, the customer could submit this request via an application running on a device 301. In other cases, the customer could submit this request using a web form. In still other cases, the customer could call an integrated voice response (IVR) system to make the request audibly.

In step 304, the request is received at computing system 305. Next, in step 306, the computing system may retrieve the customer attributes necessary to predict a recommended coverage amount. As used herein, "customer attributes" or "user attributes" refer to attributes or characteristics of a user that may be used as independent variables in making a prediction. In the context of machine learning, these attributes may be the features fed as inputs to a machine learning model. However, it may also be appreciated that in some cases, the information collected as user attributes may first be cleaned and/or transformed before being provided as final features to a given machine learning model.

The embodiments may make use of a variety of different user attributes to be used as inputs to a machine learning model for predicting a recommended coverage amount. A few exemplary attributes are shown in FIG. 3. In one embodiment, the user attributes could comprise one or more of the following: "age," "marital status," and "zip code," as these attributes may be generally correlated with the amount of insurance a typical customer may need. Other relevant attributes include "collateral products," which indicates whether a customer may have other insurance products that would provide overlapping protection (and thus potentially reduce the amount of renter's insurance needed). Embodiments could use various other suitable customer attributes in training a machine learning model and providing predictions for recommended coverage amounts.

In step 308, the customer attributes may be used to predict a recommended coverage amount. In some embodiments, this prediction may be made using a trained machine learning model. Examples of machine learning models that may be trained and used to predict recommended coverage amounts from user attribute information include, but are not limited to: decision trees, neural networks, as well as other suitable models.

In step 310, the impact of each customer attribute on the recommended coverage amount can be determined. In some embodiments, this step could be performed by an impact attribute analyzer (such as attribute impact analyzer 142). Next, in step 312, a natural language explanation of the impact of one or more attributes on the recommended coverage amount may be generated. In some embodiments, the natural language explanation can be generated by a natural language processing system (such as natural language processing system 144).

Next, in step 314, the recommended coverage value and the natural language explanation of the impact of one or more customer attributes on the recommended coverage amount can be communicated to the customer, who receives this information in step 316.

Figure 4:
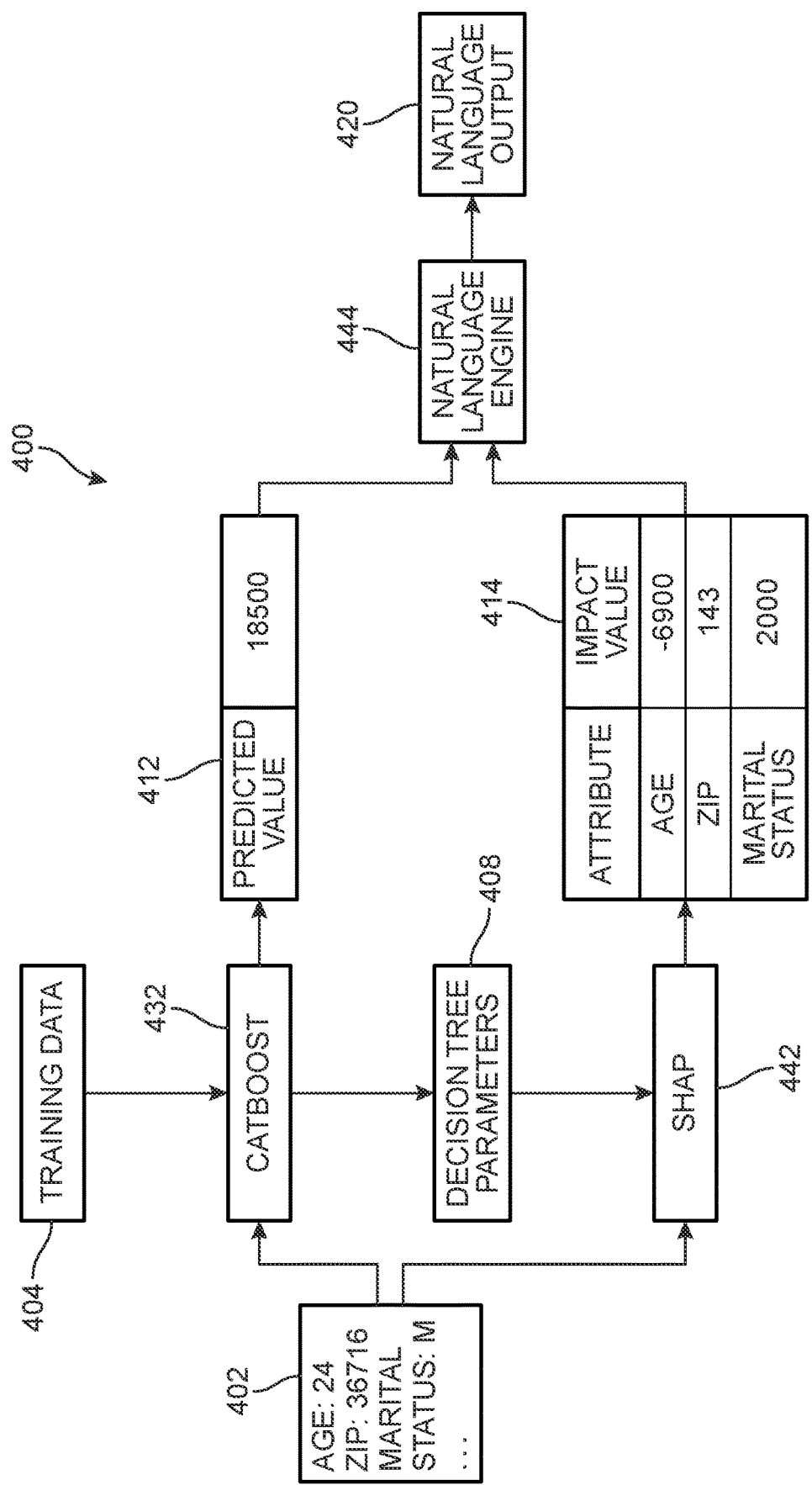
FIG. 4 is a schematic view of a particular implementation of an architecture for providing a predicted value and for generating a natural language explanation of the impact of one or more attributes on the predicted value, according to an embodiment.

FIG. 4 is a schematic view of an architecture 400 for generating a natural language explanation of a recommended coverage amount and the impact of various customer attributes on that amount. In this example, the open source Catboost implementation of a gradient boosting decision tree is used as a machine learning model 432 that has been trained using training data 404. Model 432 receives a list of customer attributes 402 as input and outputs a predicted value for a recommended coverage amount 412.

As seen in FIG. 4, the decision tree parameters 408 associated with the trained model 432 are used, along with the attributes 402, as inputs to an implementation of an impact analyzer 442. In this case, the SHAP open source library is used to generate impact values 414 (which in this example are Shapely values).

The predicted recommended coverage amount and the set of impact values are then used as inputs to a natural language processing system 444. The output of system 444 is natural language output 420 that can be communicated directly to a customer.

Figure 5:
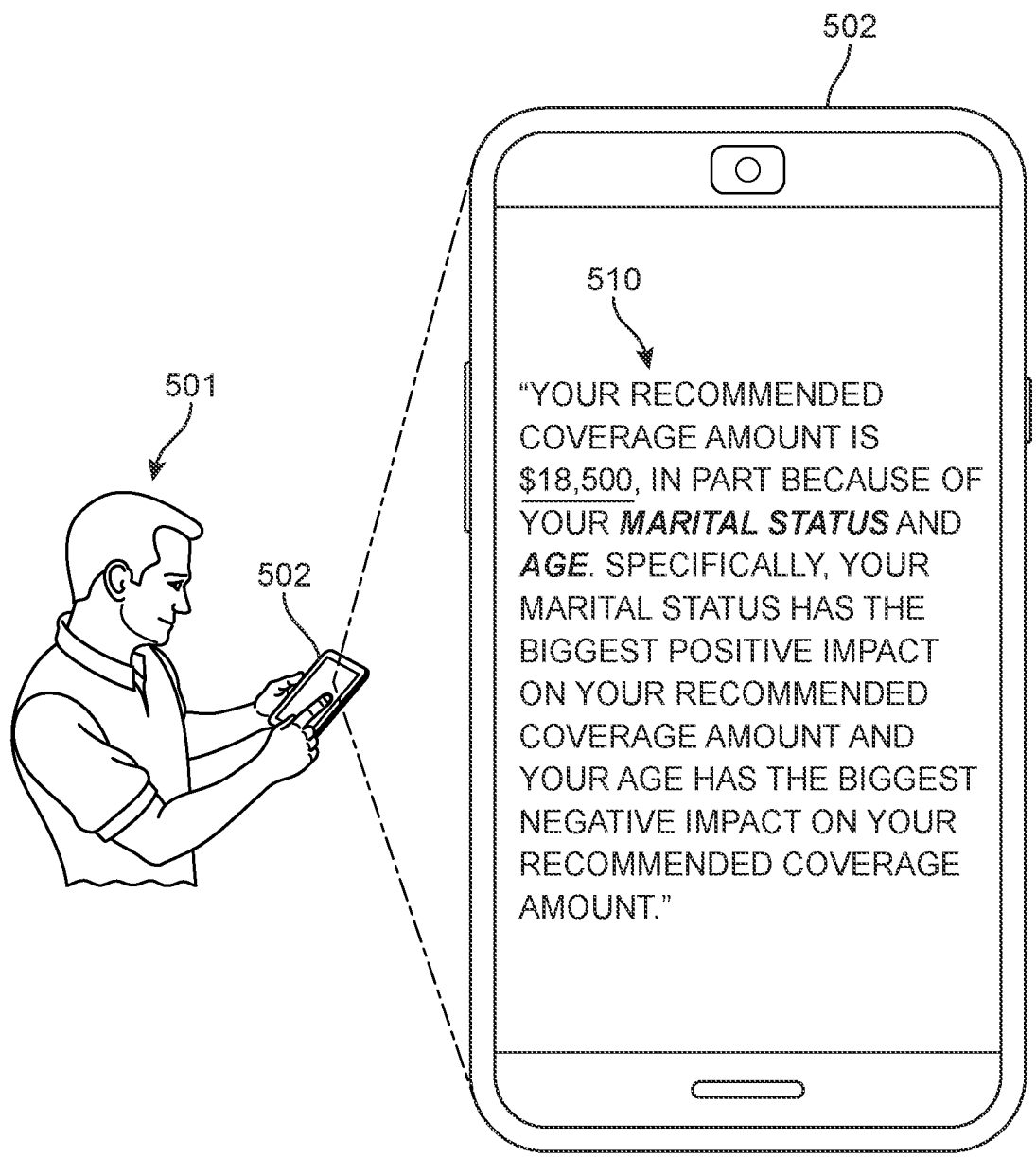
FIG. 5 is a schematic view of a customer receiving a recommended coverage amount and a natural language explanation of the impact of one or more attributes on the recommended coverage amount, according to an embodiment.

FIG. 5 shows an exemplary output for the architecture shown in FIG. 4. Here, a customer 501 may receive a natural language explanation 510 on their mobile device 502 in response to requesting rental insurance. As shown, the natural language processing system has generated a conversational summary of the recommended coverage amount. The system has also generated a natural language explanation of the specific customer attributes that had the largest effect on the recommended coverage amount. This natural language summary may help customer 501 to understand the factors that were most influential in determining the recommended coverage amount. This may help provide transparency of the process for the customer.

In the example of FIG. 5, the summary reads "Your recommended coverage amount is $18,500, in part because of your marital status and age. Specifically, your marital status has the biggest positive impact on your recommended coverage amount and your age has the biggest negative impact on your recommended coverage amount." This summary provides a natural language explanation of the fact that the customer's marital status had the biggest influence on raising the coverage amount (relative to some baseline), while the customer's age had the biggest influence on lowering the coverage amount (relative to some baseline). If the customer is surprised by the recommended coverage amount, either because it seems too high or too low, this natural language explanation can help them understand why the system suggested this particular amount.

It may be appreciated that this summary must be dynamically generated as the impact values for the customer attributes depend not only on information from the trained model, but also on that customer's specific attributes. In order to build a dynamic summary, a computing system may first determine the customer attributes with the biggest impact on the recommended coverage amount and then generate natural language explanations explaining how those customer attributes influence the recommended coverage value.

Figure 6:
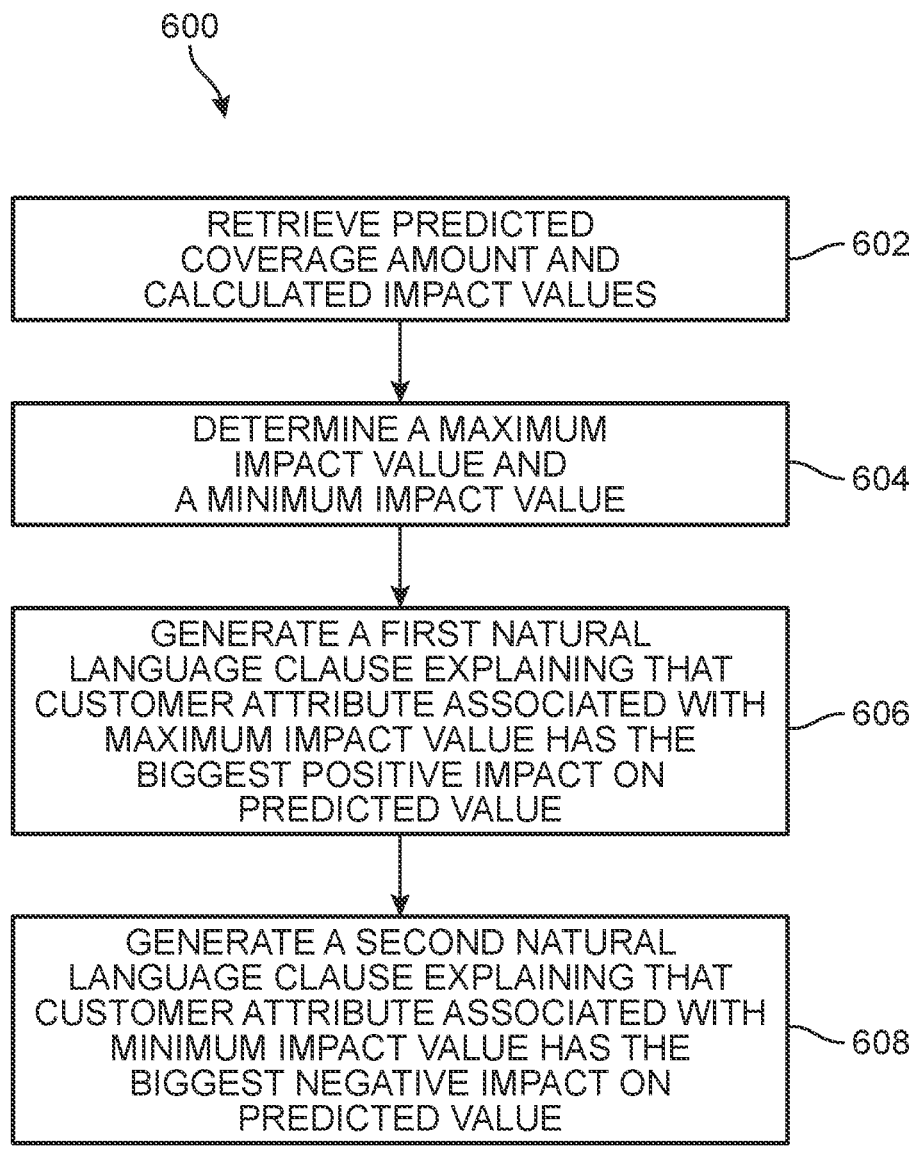
FIG. 6 is a schematic view of a process of generating a natural language explanation of the impact of one or more attributes on the recommended coverage amount, according to an embodiment.

FIG. 6 is a schematic view of a process for identifying customer attributes that may have the greatest impact on the recommended coverage values. Starting in step 602, the predicted coverage amount and the calculated impact values are retrieved. That is, the outputs of model 432 and analyzer 442 (see FIG. 4) are retrieved. Next, in step 604, the maximum impact value and the minimum impact value are determined. Here, the maximum impact value may be understood to be the impact value with the largest magnitude which is also positive. Likewise, the minimum impact value may be understood to be the impact value with the largest magnitude which is also negative.

In step 606, a first natural language clause explaining that the customer attribute associated with the maximum impact value has the biggest positive impact on the predicted value can be generated. In step 608, a second natural language clause explaining that the customer attribute associated with the minimum impact value has the biggest negative impact on the predicted value can be generated. These two clauses can then be combined into a single natural language summary, as in the exemplary summary 510 of FIG. 5.

Figure 7:
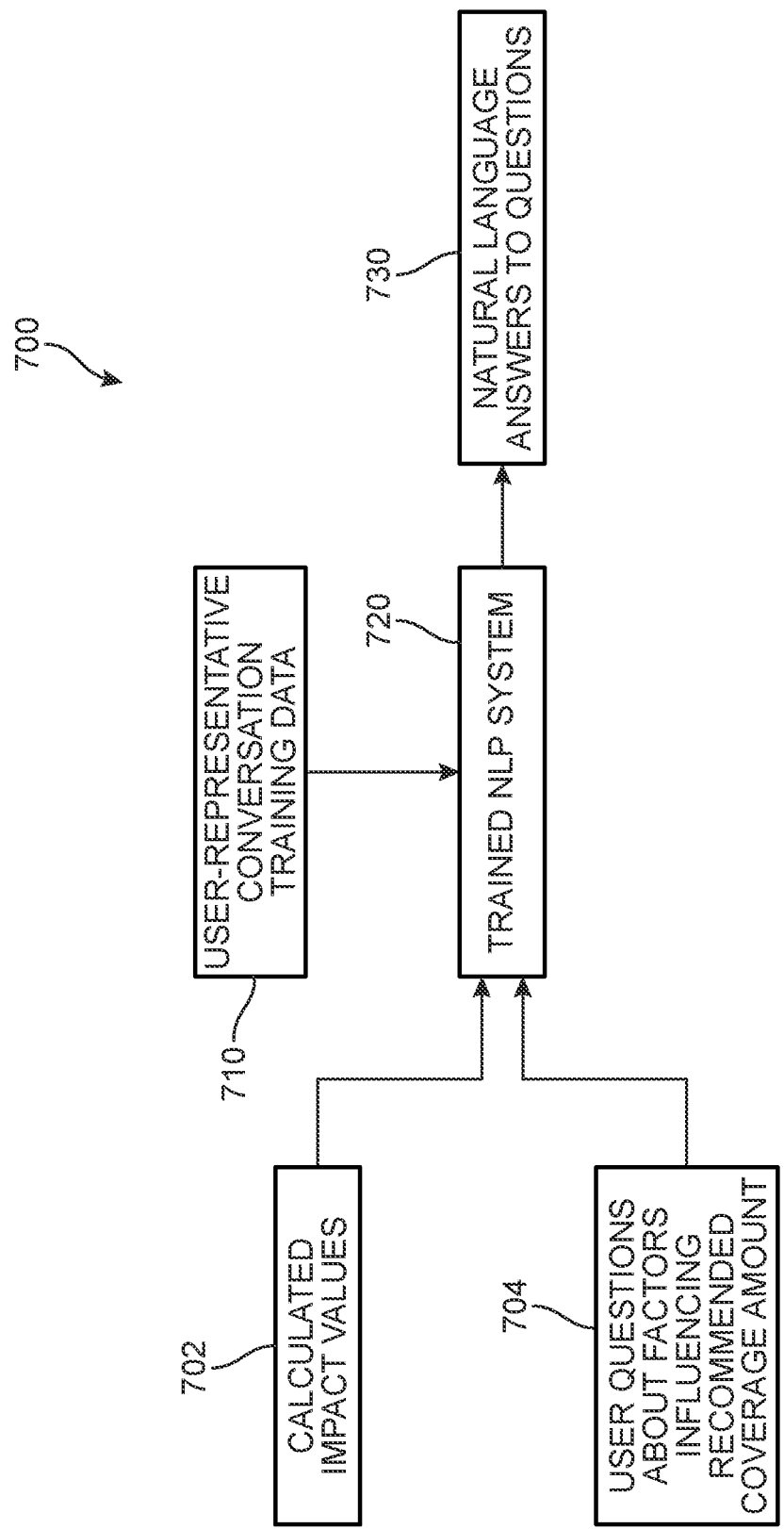
FIG. 7 is a schematic view of an architecture for predicting a recommended coverage amount for a customer and for responding to questions from the customer, according to an embodiment.

FIG. 7 is a schematic view of an architecture 700 for generating natural language answers to questions from a user, where the questions may be about the impact of various factors on the recommended coverage amount. In some embodiments, this architecture may be used with other components already described above and shown in, for example, FIG. 2. Specifically, in this case separate systems (not shown) are assumed to provide a predicted recommended coverage amount and to calculate impact values for user attributes.

Architecture 700 includes a trained natural language processing (NLP) system 720 that has been previously trained using user-representative conversation training data 710. This training data may comprise a corpus of historic and/or synthetic conversations between users (or customers) and representatives. During these conversations, a representative helps a user understand the impact of various factors (e.g., customer attributes) on a recommended coverage value. Using this corpus, NLP system 720 can be trained to respond to user queries about the impact of various factors on a recommended coverage amount with answers in a natural language form.

NLP system 720 may receive both calculated impact values 702 as well as user questions about factors that may influence the coverage amount (questions 704). As discussed above, the impact values may be calculated using other components not shown in FIG. 7, such as an attribute impact analyzer. Using these inputs, NLP system 720 may generate natural language answers to specific questions (output 730).

As an example of a question and a corresponding natural language answer, consider a customer interacting with a chat-bot during a session in which the customer has requested renter's insurance. The system may generate a predicted coverage amount based on known customer attributes, as described previously. Upon being informed of the recommended coverage amount, the customer may ask follow-up questions to try and understand how that amount was determined. For example, the customer could ask "how was the coverage amount determined?". The system could provide a natural language response such as "your coverage amount was estimated using factors such as your age, marital status, and other insurance products you already have." The customer could then ask, "which factor influenced the coverage amount the most?" In response, the system could generate a natural language response such as "your age had the greatest negative impact on your recommended coverage amount and your marital status had the greatest positive impact on your recommended coverage amount." Such natural language responses may be generated by a trained NLP system (such as NLP system 720) using the specific impact values that were calculated for the customer specific prediction.

Figure 8:
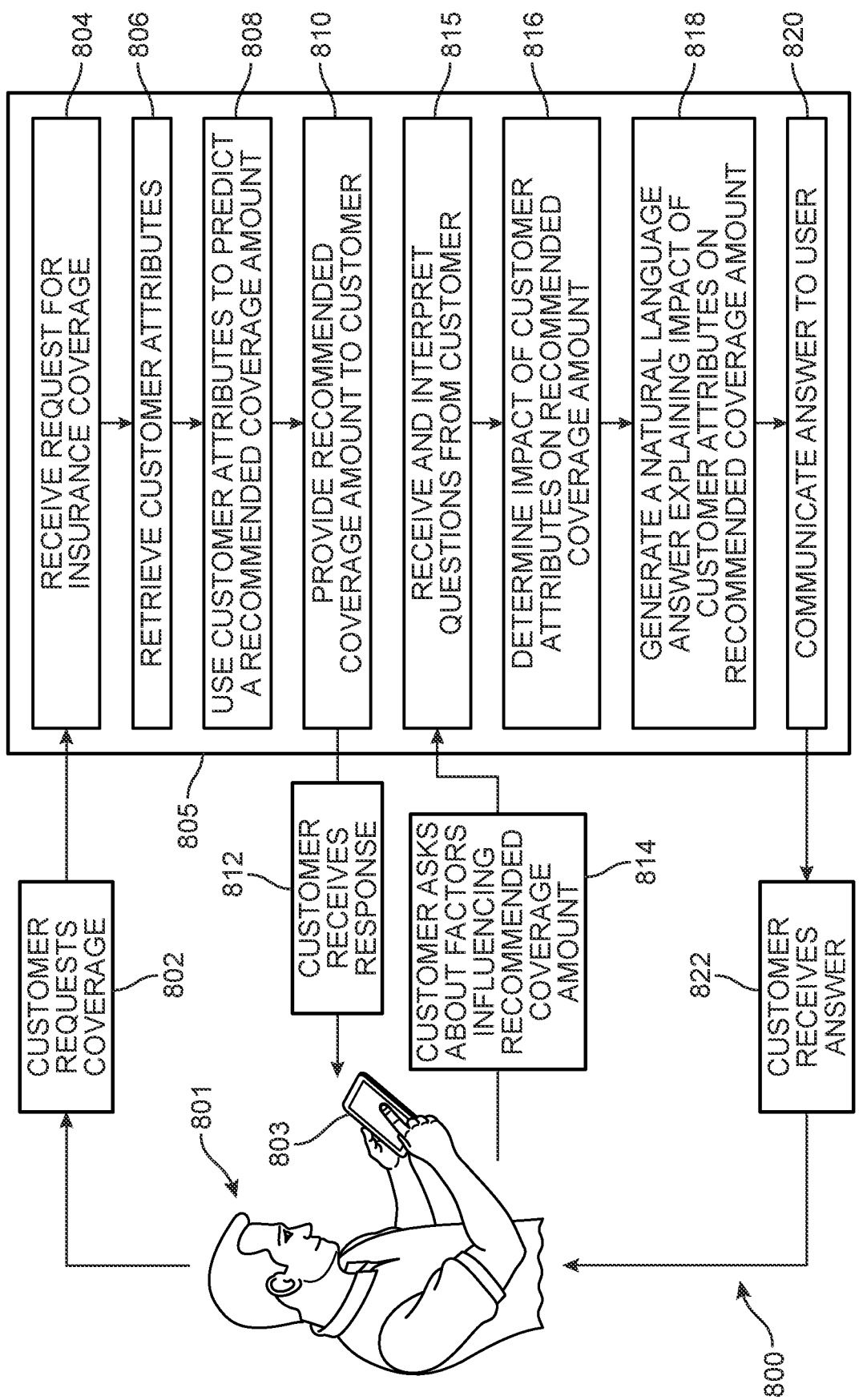
FIG. 8 is a schematic view of a process for predicting a recommended coverage amount for a customer and for responding to questions from the customer, according to an embodiment.

FIG. 8 is a schematic view of how the exemplary system may be used to answer a customer's questions. Specifically, the process shows how a system can answer a customer's questions about the influence of different attributes on a recommended coverage amount.

The exemplary process 800 begins at step 802, where a customer 801 may submit a request for renter's insurance. In some cases, the customer could submit this request via an application running on a device 803. In other cases, the customer could submit this request using a web form. In still other cases, the customer could call an integrated voice response (IVR) system to make the request audibly.

In step 804, the request is received at computing system 805. Next, in step 806, the computing system may retrieve the customer attributes necessary to predict a recommended coverage amount.

In step 808, the customer attributes may be used to predict a recommended coverage amount. In step 810, the recommended coverage amount may be provided to customer 801. After receiving the recommended coverage amount in step 812, customer 801 could ask one or more questions about factors that influence the recommended coverage amount in step 814.

In step 815, questions from the customer can be received and interpreted into information that can be used by one or more systems. In some embodiments, a natural language processing system can interpret those questions using methods and systems from natural language understanding (NLU).

In step 816, the impact of customer attributes on the recommended coverage amount can be calculated using an impact analyzer. In some cases, the system can select only a subset of attributes (or even just a single attribute) to analyze, based on the customer's specific question. For example, if the customer wants to know how their age may have influenced the recommended coverage amount, the system could compute the impact value for only the age attribute. In some cases, this could help save computing power and improve the efficiency and/or speed of the computing system in responding to customer questions.

Next, in step 818, a natural language explanation of the impact of one or more customer attributes on the recommended coverage amount can be generated. In some embodiments, the information provided in step 818 may include generalized, or qualitative, information about how attributes affected the recommended coverage amount. For example, the system could explain that a given attribute was "the most important factor" in determining the recommended coverage amount. As another example, the system could provide rankings of attributes, with higher ranked attributes having a higher impact on the recommended coverage amount. In some embodiments, the system could provide quantitative information for the impact of each attribute on the recommend coverage value. For example, the system could calculate and provide the exact contribution of each attribute, in dollars, to the total recommended coverage amount. Next, this explanation can be communicated to the customer in step 820. The customer may receive this answer in step 822, and accordingly ask further questions if desired.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, python, java, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer implemented method to determine an impact of a user attribute on a predicted value, the method comprising:
    communicating training data to a computing system comprising a processor and a memory, the training data comprising at least one of historic data and synthetic data comprising user attributes and associated target predicted values, the training data provided to a machine learning system contained in a prediction module executing on the computing system;
    using the machine learning system running on the computing system to train a machine learning model using the training data provided to the machine learning system, training of the machine learning model generating trained model parameters for use in the machine learning model;
    receiving from the user at the computing system a request for a financial product or service, the computing system comprising the prediction module and an explanation module, an attribute impact analyzer and a natural language processing system running in the explanation module on the computing system;
    using the computing system to obtain a user attribute associated with the user and to communicate the user attribute to the machine learning system and the attribute impact analyzer, the user attribute comprising a user attribute value for the user;
    using the machine learning system to apply the user attribute as an independent variable in making a prediction in combination with the training model parameters in the machine learning model to generate a predicted value for the user;
    using the attribute impact analyzer executing on the computing system to take the user attribute and the trained model parameters, to determine a sensitivity of the predicted value to the user attribute value, and to generate a calculated impact value on the predicted value for the user attribute;
    communicating the predicted value from the machine learning system and the calculated impact value from the attribute impact analyzer to the natural language processing system;
    and
    using the predicted value and the calculated impact value in the natural language processing system running on the computing system to generate a natural language explanation for the user that conveys to the user how the attribute value impacted the predicted value.

2. The method of claim 1, wherein the machine learning system comprises a decision tree.

3. The method of claim 1, wherein using the attribute impact analyzer further comprise using algorithms in the impact analyzer to calculate a Shapley value for the user attribute.

4. The method of claim 3, wherein the Shapley value comprises an average marginal contribution of the user attribute value over all possible iterations of the machine learning model.

5. The method of claim 3, wherein the using the attribute impact analyzer further comprises using the Shapley value to infer how much the predicted value differs from a reference value as a result of the user attribute value.

6. The method of claim 1, wherein the predicted value comprises a recommended amount of coverage for an insurance policy.

7. The method of claim 1, wherein the method further comprises using the computing system to communicate the predicted value and the natural language explanation of the impact to the user.

8. The method of claim 7, wherein using the computing system to communicate comprises using the computing system to send a text communication to the user.

9. The method of claim 1, wherein the user attribute comprises a user age, a user zip code, or a user marital status.

10. A computer implemented method to determine an impact of user attributes on a predicted value, the method comprising:
- communicating training data to one or more computing systems each comprising a processor and a memory, the training data comprising at least one of historic data and synthetic data comprising user attributes and associated target predicted values, the training data provided to a machine learning system contained in a prediction module executing on the computing system;
- using the machine learning system running on the one or more computing systems to train a machine learning model using the training data provided to the machine learning system, training of the machine learning model generating trained model parameters for use in the machine learning model;
- receiving from the user, at the one or more computing systems, a request for a financial product or service, the one or more computing systems comprising the prediction module and an explanation module, an attribute impact analyzer and a natural language processing system running in the explanation module on the computing system;
- using at least one of the computing systems to obtain a plurality of user attributes associated with the user and to communicate the plurality of attributes to the machine learning system and the attribute impact analyzer, each user attribute comprising a user attribute value for the user;
- using the machine learning system to apply the plurality of user attributes as independent variables in making a prediction in combination with the training model parameters in the machine learning model to generate a predicted value for the user;
- using the attribute impact analyzer executing on the one or more computing systems to take each user attribute and the trained model parameters and to determine a sensitivity of the predicted value to each user attribute value and to generate a calculated impact value on the predicted value for each user attribute;
- communicating the predicted value from the machine learning system and each calculated impact value from the attribute impact analyzer to the natural language processing system; and
- using the predicted value and the calculated impact value in the natural language processing system running on the one or more computing systems to generate a natural language explanation for the user that conveys to the user how each attribute value impacted the predicted value.

11. The method of claim 10, wherein using the natural language processing system to generate a natural language explanation comprises identifying which attribute value had the highest impact in determining the predicted value.

12. The method of claim 10, wherein using the natural language processing system to generate a natural language explanation comprises ranking the attribute values based on a level of impact in determining the predicted value.

13. The method of claim 10, wherein using the natural language processing system to generate a natural language explanation comprises providing qualitative information on the impact of each attribute value in determining the predicted value.

14. The method of claim 13, wherein the qualitative information comprises an exact monetary contribution of each attribute value to the predicted value.

15. The method of claim 10, wherein the method further comprises using at least one of the computing systems to communicate the predicted value and the natural language explanation of the impact of each attribute value to the user.

16. The method of claim 10, wherein using the attribute impact analyzer further comprise using algorithms in the impact analyzer to calculate a Shapley value for each user attribute.

17. The method of claim 16, wherein the Shapley value comprises an average marginal contribution of the user attribute value over all possible iterations of the machine learning model.

18. The method of claim 16, wherein the using the attribute impact analyzer further comprises using the Shapley value to infer how much the predicted value differs from a reference value as a result of each user attribute value.

19. A computing system, comprising:
- a device processor;
- a communication interface in communication with the device processor for transferring information between the computing system and a user and communicating training data to the computing system, the training data comprising at least one of historic data and synthetic data comprising user attributes and associated target predicted values;
- a non-transitory computer readable medium in communication with the device processor and storing instructions that when executed by the device processor provide:
- a prediction module comprising a machine learning system that receives the training data, trains a machine learning model using the training data to generate trained model parameters for use in a machine learning model, and uses the machine learning model comprising a set of model parameters to predict a recommended coverage value based on a set of user attributes for the user and the trained model parameters, the machine learning system communicating the trained model parameters to an attribute impact analyzer and the predicted recommended coverage value to a natural language processing system; and
- an explanation module comprising:
  - the attribute impact analyzer for taking the set of user attributes and the trained model parameters, determining a sensitivity of the predicted recommended coverage to each user attribute value, generating a calculated impact value on the predicted recommended coverage for each user attribute, and communicating the calculated impact values to the natural language processing system, wherein the attribute impact analyzer uses at least the set of user attributes as independent variables in making a prediction in combination with the training model parameters in the machine learning model; and the natural language processing system for generating a natural language summary of the impact of each attribute on the recommended coverage value using the predicted recommended coverage value and the calculated impact values.

20. The computing system according to claim 19, wherein the communication interface communicates the predicted value and the natural language explanation of the impact of each attribute to the user.

* * * * *